(12) United States Patent
Uchimura et al.

(10) Patent No.: US 10,899,540 B2
(45) Date of Patent: Jan. 26, 2021

(54) CARGO MANAGEMENT DEVICE, CARGO MANAGEMENT METHOD, AND PROGRAM

(71) Applicant: NEC CORPORATION, Tokyo (JP)

(72) Inventors: Jun Uchimura, Tokyo (JP); Hideaki Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 249 days.

(21) Appl. No.: 15/999,779

(22) PCT Filed: Mar. 1, 2017

(86) PCT No.: PCT/JP2017/008099
§ 371 (c)(1),
(2) Date: Aug. 20, 2018

(87) PCT Pub. No.: WO2017/159365
PCT Pub. Date: Sep. 21, 2017

(65) Prior Publication Data
US 2020/0165065 A1     May 28, 2020

(30) Foreign Application Priority Data

Mar. 18, 2016   (JP) .................. 2016-054713

(51) Int. Cl.
*G06F 7/00*        (2006.01)
*B65G 1/137*       (2006.01)
*B66F 9/24*        (2006.01)

(52) U.S. Cl.
CPC ............. *B65G 1/137* (2013.01); *B66F 9/24* (2013.01); *B65G 2203/0216* (2013.01)

(58) Field of Classification Search
None
See application file for complete search history.

(56) References Cited

U.S. PATENT DOCUMENTS

| 2003/0089771 | A1  | 5/2003  | Cybulski et al. |
| 2011/0181400 | A1* | 7/2011  | Goda ............... G06Q 10/087 340/10.41 |
| 2013/0041524 | A1  | 2/2013  | Brey |

FOREIGN PATENT DOCUMENTS

| JP | 10-182096 A   |   | 7/1998 |
| JP | 2005-509575 A |   | 4/2005 |
| JP | 2008-019046 A |   | 1/2008 |
| JP | 2008-290859 A |   | 12/2008 |
| JP | 2009-120380 A |   | 6/2009 |
| JP | 2010-083674 A |   | 4/2010 |
| JP | 2010083674 A  | * | 4/2010 |
| JP | 2011-219229 A |   | 11/2011 |

(Continued)

OTHER PUBLICATIONS

Nikkei BP Mook, "Part 2. Experiments/practical cases, Utilization of IC tags in logistics work", Nikkei BP Mook, All of wireless IC tag, Nikkei BP Inc., Apr. 20, 2004, 5 pages.

(Continued)

*Primary Examiner* — Yolanda R Cumbess
(74) *Attorney, Agent, or Firm* — Sughrue Mion, PLLC

(57) ABSTRACT

It is determined whether or not a cargo identifier (ID) transmitted from a cargo tag attached to a container has been detected by a first antenna provided in a fork, and a carrying-in source or a carrying-out destination of the cargo is determined according to a detection situation of the cargo ID.

6 Claims, 9 Drawing Sheets

(56) References Cited

FOREIGN PATENT DOCUMENTS

JP          2013-216481 A    10/2013

OTHER PUBLICATIONS

International Search Report for PCT/JP2017/008099 dated Jun. 6, 2017 [PCT/ISA/210].
Communication dated Jul. 1, 2019, from the Intellectual Property Office of Singapore in counterpart application No. 11201807008Q.
Office Action dated Mar. 27, 2020 in Japanese Application No. 2016-054713.

\* cited by examiner

31

CARGO MANAGEMENT DEVICE, CARGO MANAGEMENT METHOD, AND PROGRAM

CROSS REFERENCE TO RELATED APPLICATIONS

This application is a National Stage of International Application No. PCT/JP2017/008099 filed Mar. 1, 2017, claiming priority based on Japanese Patent Application No. 2016-054713 filed Mar. 18, 2016, the content of which is incorporated herein by reference.

TECHNICAL FIELD

The present invention relates to a cargo management device, a cargo management method, and a program.

BACKGROUND ART

In the logistics industry, cargo distribution management is performed by reading identification numbers of cargos from radio frequency identification (RFID) tags attached to the cargos. Techniques for performing management of cargos using RFID tags are disclosed in Patent Literature 1 and Non-Patent Literature 1.

CITATION LIST

Patent Literature

Patent Literature 1: Japanese Unexamined Patent Application, First Publication No. 2008-19046

Non-Patent Literature

Non-Patent Literature 1: Part 2. Experiments/practical cases, Utilization of IC tags in logistics work, "Nikkei BP Mook, All of wireless IC tag", Nikkei BP Inc., Apr. 20, 2004, p. 70-71

SUMMARY OF INVENTION

Technical Problem

In the technique of Patent Literature 1 described above, a technique for reading ID information of an RFID tag attached to a container when a forklift inserts a fork-shaped arm into the container is disclosed. Further, the same technique is also described in Non-Patent Literature 1.

However, it may be difficult to determine a carrying-in source or a carrying-out destination. For example, when hydraulic pressure information indicating raising and lowering of the fork of the forklift is not acquired in transport of the container, a place where the transport vehicle such as the forklift performs carrying-in and carrying-out of the cargo may not be able to be accurately specified.

Accordingly, an object of the present invention is to provide a cargo management device, a cargo management method and a program that solve the above-described problems.

Solution to Problem

According to a first aspect of the present invention, a cargo management device includes a cargo management unit configured to: determine whether or not a cargo identifier (ID) transmitted from a cargo ID transmission device attached to a cargo has been detected by a first antenna provided in a cargo gripping mechanism of a transport vehicle; and determine a carrying-in source or a carrying-out destination of the cargo based on a detection situation of the cargo ID.

According to a second aspect of the present invention, a cargo management method includes determining whether or not a cargo ID transmitted from a cargo ID transmission device attached to a cargo has been detected by a first antenna provided in a cargo gripping mechanism of a transport vehicle, and determining a carrying-in source or a carrying-out destination of the cargo based on a detection situation of the cargo ID.

According to a third aspect of the present invention, a program causes a computer of a cargo management device to function as a cargo management means configured to: determine whether or not a cargo ID transmitted from a cargo ID transmission device attached to a cargo has been detected by a first antenna provided in a cargo gripping mechanism of a transport vehicle; and determine a carrying-in source or a carrying-out destination of the cargo based on a detection situation of the cargo ID.

Advantageous Effects of Invention

According to the present invention, it is possible to determine a carrying-in source or a carrying-out destination of a cargo that a transport vehicle transports without obtaining hydraulic pressure information of a cargo gripping mechanism of the transport vehicle.

DESCRIPTION OF EMBODIMENTS

Hereinafter, a cargo management device according to an embodiment of the present invention will be described with reference to the drawings.

Figure 1:
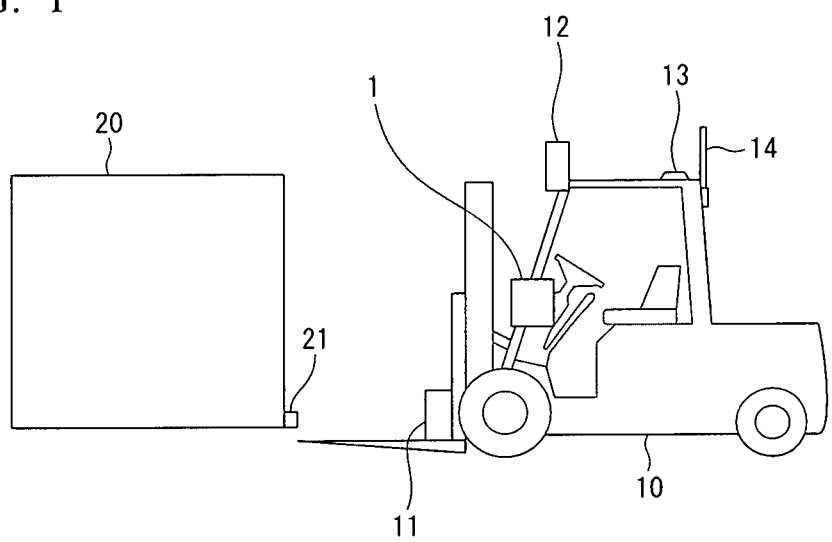
FIG. 1 is a diagram showing a relationship between a forklift and a container according to an embodiment of the present invention.

FIG. 1 is a diagram showing a relationship between a forklift and a container according to the embodiment.

In FIG. 1, the forklift 10 is an example of a transport vehicle. The container 20 is an example of a cargo. The forklift 10 includes a cargo management device 1, a first antenna 11, a second antenna 12, a satellite positioning antenna 13, and a communication antenna 14. In addition, a cargo tag 21 which is a cargo identifier (ID) transmission device is attached to the container 20.

The first antenna 11 is attached to a fork (a cargo gripping mechanism) of the forklift 10. The cargo tag 21 is attached at a position on lower side of the container so that communication with the first antenna 11 can be performed when the forklift 10 inserts the fork under a bottom of the container 20 in order to transport the container 20.

The forklift 10 transports the container 20 in response to an operation of a driver. When the forklift 10 moves the container 20 to another position, the forklift 10 lifts up the container 20 to a predetermined height. The driver operates the forklift 10 to lift the container 20 to the predetermined height, thereby ensuring a view of the driver at the time of driving. The second antenna 12 is installed at a position on the forklift 10 at which communication with the cargo tag 21 can be performed at a predetermined height at which the container 20 is lifted up in response to an operation of the driver when the forklift 10 transports the container 20.

The first antenna 11 and the second antenna 12 are antennas that receive a signal transmitted by the cargo tag 21. At least a cargo ID is included in the signal transmitted by the cargo tag 21.

The satellite positioning antenna 13 is an antenna that receives a signal from an artificial satellite. The cargo management device 1 receives a signal from the artificial satellite and acquires information included in the signal. The cargo management device 1 detects a position of the forklift 10 on the basis of the information included in the signal.

The communication antenna 14 is an antenna that transmits and receives a signal when the cargo management device 1 communicates with another device. The communication antenna 14 is connected to the cargo management device 1 by a cable.

The cargo management device 1 determines a carrying-in source or a carrying-out destination of a cargo such as the container 20. Hereinafter, the cargo management device 1 will be described in detail.

Figure 2:
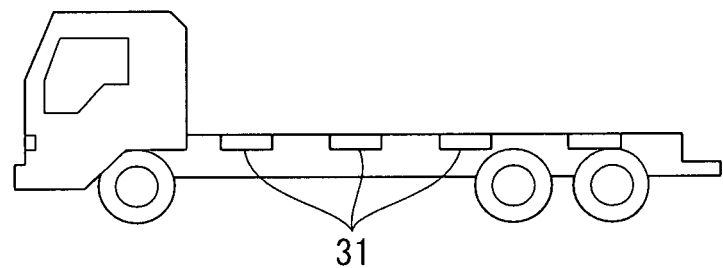
FIG. 2 is a first diagram showing an example of a carrying-in source or a carrying-out destination according to the embodiment of the present invention.

FIG. 2 is a first diagram showing an example of the carrying-in source or the carrying-out destination.

The example of the carrying-in source or the carrying-out destination shown in FIG. 2 shows a first truck. Placement position tags 31 which are placement position ID transmission devices are attached to the first truck.

Figure 3:
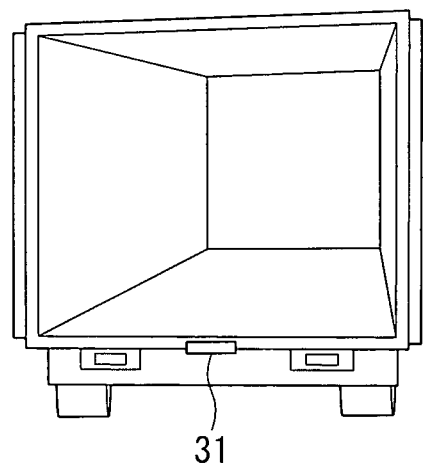
FIG. 3 is a second diagram showing an example of the carrying-in source or the carrying-out destination according to the embodiment of the present invention.

FIG. 3 is a second diagram showing an example of the carrying-in source or the carrying-out destination.

The example of the carrying-in source or a carrying-out destination shown in FIG. 3 shows a second truck. A placement position tag 31 is also attached to the second truck.

Figure 4:
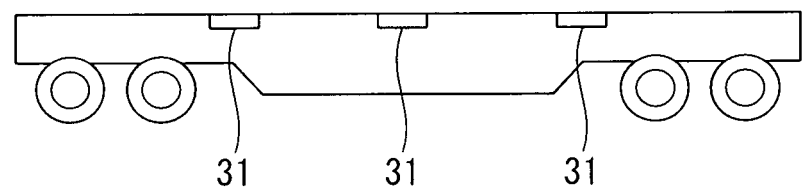
FIG. 4 is a third diagram showing an example of the carrying-in source or the carrying-out destination according to the embodiment of the present invention.

FIG. 4 is a third diagram showing an example of the carrying-in source or the carrying-out destination.

The example of the carrying-in source or the carrying-out destination shown in FIG. 4 shows a freight vehicle. A placement position tag 31 is also attached to the freight vehicle.

Figure 5:
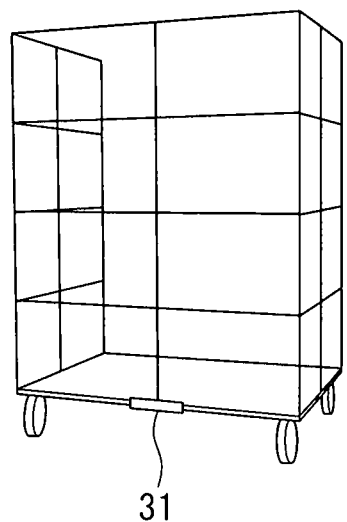
FIG. 5 is a fourth diagram showing an example of the carrying-in source or the carrying-out destination according to the embodiment of the present invention.

FIG. 5 is a fourth diagram showing an example of the carrying-in source or the carrying-out destination.

The example of the carrying-in source or the carrying-out destination shown in FIG. 5 shows a cage cart. A placement position tag 31 is also attached to the cage cart.

The cargo management device 1 according to the embodiment specifies a site such as a container yard, or the carrying-in source or the carrying-out destination such as the truck, the freight vehicle, and the cage cart shown in FIGS. 2 to 5. The truck, the freight vehicle, the cage cart, and the like are examples of a loading structure on which the container 20 is loaded.

Figure 6:
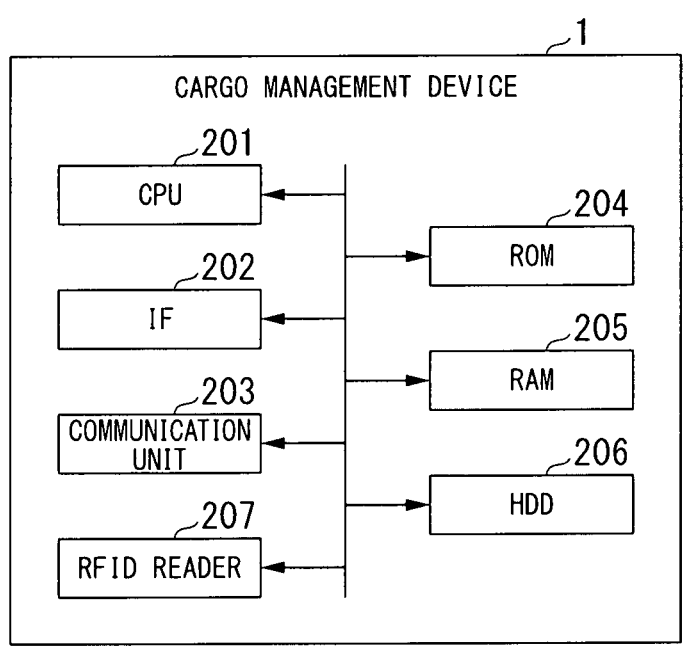
FIG. 6 is a diagram showing a hardware configuration of a cargo management device according to an embodiment of the present invention.

FIG. 6 is a diagram showing a hardware configuration of the cargo management device.

As shown in FIG. 6, the cargo management device 1 includes components such as a central processing unit (CPU) 201, an interface (IF) 202, a communication unit 203, a read only memory (ROM) 204, a random access memory (RAM) 205, a hard disk drive (HDD) 206, and an RFID reader 207. The communication unit 203 performs transmission and reception of a signal via the communication antenna 14. The RFID reader 207 performs control of reception of signals received by the first antenna 11 or the second antenna 12. The IF 202 is connected to, for example, a touch panel display provided in the cargo management device 1.

Figure 7:
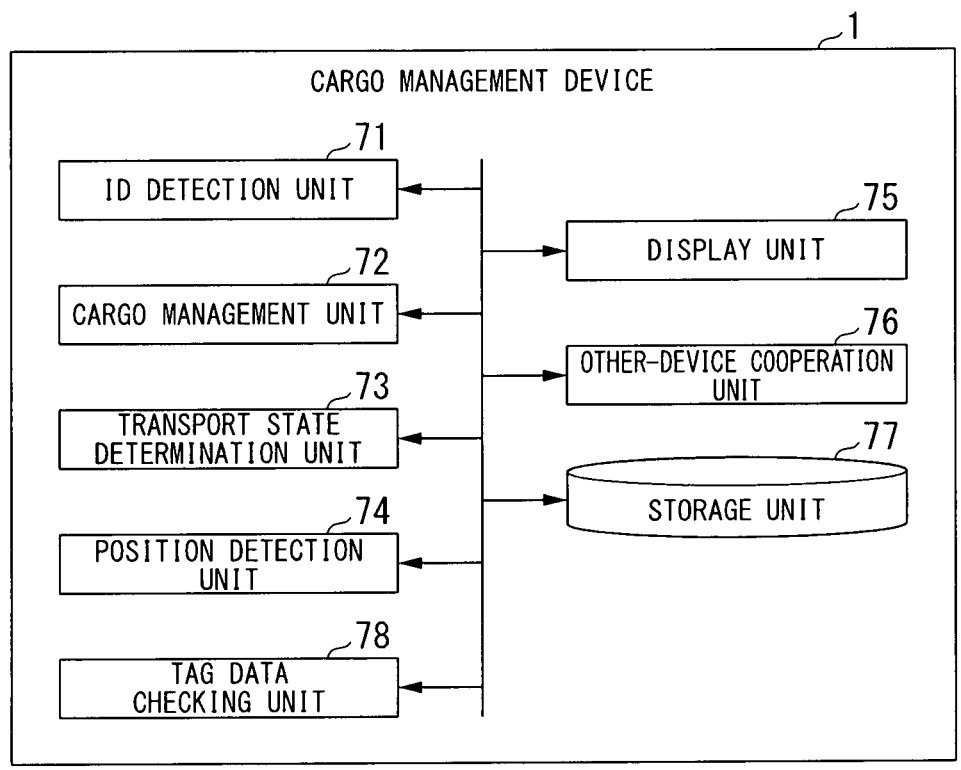
FIG. 7 is a functional block diagram of the cargo management device according to the embodiment of the present invention.

FIG. 7 is a functional block diagram of the cargo management device.

The cargo management device 1 includes functions of an ID detection unit 71, a cargo management unit 72, a transport state determination unit 73, a position detection unit 74, a display unit 75, an other-device cooperation unit 76 and a tag data checking unit 78 by the CPU 101 executing a program that is stored in advance. Further, the cargo management device 1 includes a storage unit 77.

The ID detection unit 71 detects the ID on the basis of the signal transmitted from the cargo tag 21 or the placement position tag 31. The ID is a cargo ID, a placement position ID, or the like. The cargo ID includes at least identification information of the cargo. For example, the cargo may be uniquely identified by the cargo ID. The placement position ID includes at least identification information of the truck, the freight vehicle, the cage cart, or the like of which a placement position can be specified. For example, the truck, the freight vehicle, and the cage cart are uniquely identified by the placement position ID.

The cargo management unit 72 determines the carrying-in source or the carrying-out destination of the container 20, which is a cargo according to a detection situation of the ID of the ID detection unit 71.

The transport state determination unit 73 determines a cargo transport state of the forklift 10 according to a situation in which the cargo ID has been detected by the first antenna 11 or the second antenna 12.

The position detection unit 74 detects a position of the forklift 10 on the basis of a signal transmitted from the satellite via the satellite positioning antenna 13.

The display unit 75 displays information on the cargo management device 1.

The other-device cooperation unit 76 transmits and receives information to and from another device connected via the communication antenna 14.

The tag data checking unit 78 checks a data system included in the received cargo ID, the received placement position ID, and the like.

The storage unit 77 stores various types of information.

Figure 8:
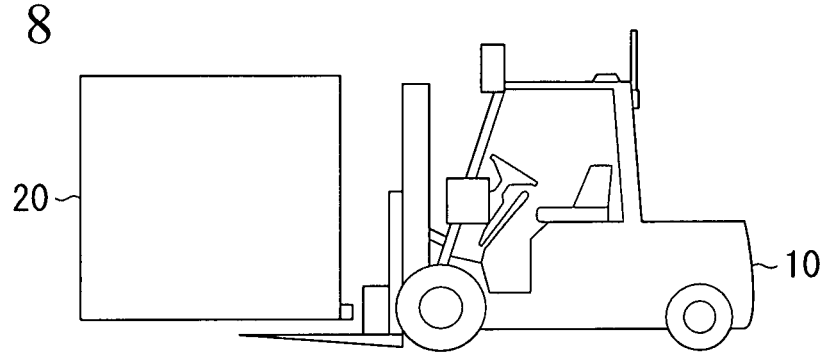
FIG. 8 is a diagram showing a first operation example of the forklift according to the embodiment of the present invention.

FIG. 8 is a diagram showing a first operation example of the forklift.

FIG. 8 shows a state in which the forklift 10 inserts a fork of the forklift 10 under a bottom of a container 20 that is placed at a site such as a container yard. This example is a situation to be viewed at a first timing when the forklift 10 lifts up the container 20 from the ground and starts to carry the container 20 or a second timing when the forklift 10 moves the container 20 and places the container 20 at a predetermined position at the site.

In the case where the cargo management unit 72 determines that the first timing occurs, the cargo management unit 72 first determines that the cargo ID is not received by the first antenna 11 or the second antenna 12 in a state in which the container 20 is not being carried (1-*a*). Then, when the fork is inserted under the container 20, the cargo management unit 72 determines that the cargo ID is received using only the first antenna 11 (1-*b*). When such a time-series situation occurs, the cargo management unit 72 determines that the first timing has occurred. It should be noted that the second antenna 12 is attached to the forklift 10 with directivity for radio waves so that the cargo ID cannot be detected in the situation 1-*b*.

In the case where the cargo management unit 72 determines that the second timing occurs, the driver operates the forklift 10 to lift up the container 20, and the cargo management unit 72 determines that the cargo ID is received by both the first antenna 11 and the second antenna 12 (2-*a*). Then, when the container 20 is placed at a movement destination, the cargo management unit 72 determines that the cargo ID is received using only the first antenna 11 (2-*b*). When the forklift 10 is reversed, the cargo management unit 72 determines that the cargo ID is not received by both of the first antenna 11 and the second antenna 12 (2-*c*). When such a time-series situation occurs, the cargo management unit 72 determines that the second timing has occurred. It should be noted that the second antenna 12 is attached to the forklift 10 with directivity for radio waves so that the cargo ID cannot be detected in the situation 2-*b*.

Figure 9:
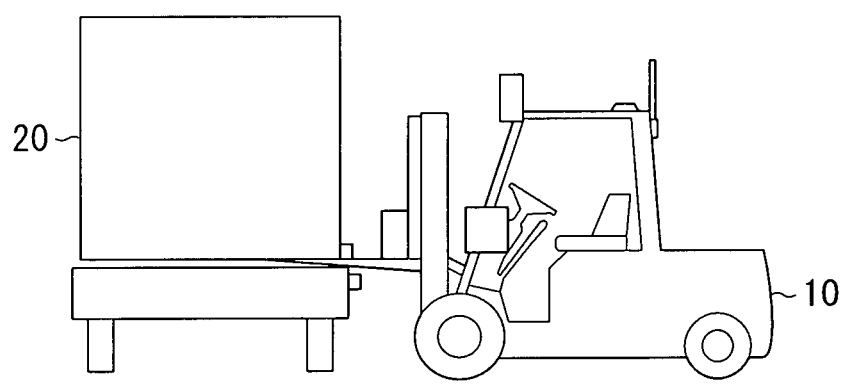
FIG. 9 is a diagram showing a second operation example of the forklift according to the embodiment of the present invention.

FIG. 9 is a diagram showing a second operation example of the forklift.

FIG. 9 shows a state in which the fork of the forklift 10 is inserted under the bottom of the container 20 in a state in which the container 20 is disposed in a freight vehicle on which the forklift 10 loads the container 20. This example is a situation to be viewed at a third timing when the forklift 10 lifts up the container 20 from the freight vehicle and starts to transport the container 20 to another position, or a fourth timing when the forklift 10 moves the container 20 from another position to the freight vehicle and loads the container 20 onto the freight vehicle.

In the case where the cargo management unit 72 determines that the third timing occurs, the cargo management unit 72 first determines that both the first antenna 11 and the second antenna 12 cannot detect the cargo ID (3-*a*). Then, the cargo management unit 72 determines that the cargo ID and the placement position ID are detected by the first antenna 11 (3-*b*). When such a time-series situation occurs, the cargo management unit 72 determines that the third timing has occurred. It should be noted that the second antenna 12 is attached to the forklift 10 with directivity for radio waves so that the cargo ID and the placement position ID cannot be detected in the situation 3-*b*.

In the case where the cargo management unit 72 determines that the fourth timing occurs, the cargo management unit 72 first determines that the cargo ID is detected by both the first antenna 11 and the second antenna, for example, during traveling of the forklift 10 (4-*a*). Then, when the container is disposed on the freight vehicle, the cargo management unit 72 determines that the cargo ID cannot be detected by the second antenna (4-*b*). Then, the cargo management unit 72 determines that both the cargo ID and the placement position ID are detected by the first antenna 11 (4-*c*). When such a time-series situation occurs, the cargo management unit 72 determines that the fourth timing has occurred. It should be noted that the second antenna 12 is attached to the forklift 10 with directivity for radio waves so that the cargo ID and the placement position ID cannot be detected under the situation 4-*c*.

Figure 10:
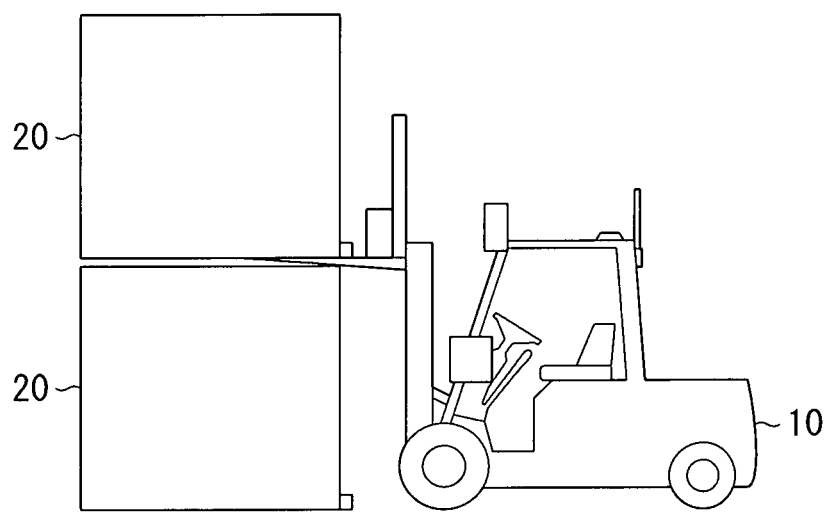
FIG. 10 is a diagram showing a third operation example of the forklift according to the embodiment of the present invention.

FIG. 10 is a diagram showing a third operation example of the forklift.

FIG. 10 shows a state in which the forklift 10 inserts the fork of the forklift 10 under a bottom of a container 20 disposed at an upper stage in a state in which containers 20 are disposed in a stacked state. This example is a situation to be viewed at a fifth timing when the forklift 10 lifts up the container 20 disposed at the upper stage and starts to carry the container 20 to another position or a sixth timing when the disposition of the container 20 that the forklift 10 has moved from the other position onto another container 20 is assumed to have been completed.

In the case where the cargo management unit 72 determines that the fifth timing occurs, the cargo management unit 72 first determines that the cargo ID cannot be detected by both the first antenna 11 and the second antenna since the container 20 is not being carried (5-*a*). Then, since the fork of the forklift 10 is inserted under the bottom of the upper container 20, the cargo management unit 72 determines that the cargo ID is detected by both the first antenna 11 and the second antenna 12 (5-*b*). When such a time-series situation occurs, the cargo management unit 72 determines that the fifth timing has occurred.

In the case where the cargo management unit 72 determines that the sixth timing occurs, the cargo management unit 72 first determines that the cargo ID is detected by both the first antenna 11 and the second antenna 12 while the forklift 10 is traveling (6-*a*). Further, the cargo management unit 72 determines that a period of time during which the cargo ID is detected by both the first antenna 11 and the second antenna 12 is equal to or longer than a predetermined time (6-*b*). Also, the cargo management unit 72 determines that the cargo ID cannot be detected by both the first antenna 11 and the second antenna 12 (6-*c*). When such a time-series situation occurs, the cargo management unit 72 determines that the sixth timing has occurred.

Each of the above-described schemes of determining the timings shown in FIGS. 8 to 10 are examples, and the cargo management unit 72 may determine each of the above timings or other timings according to reception timings of the cargo ID or the placement position ID received by the first antenna 11 or the second antenna 12 or a time-series reception situation.

Figure 11:
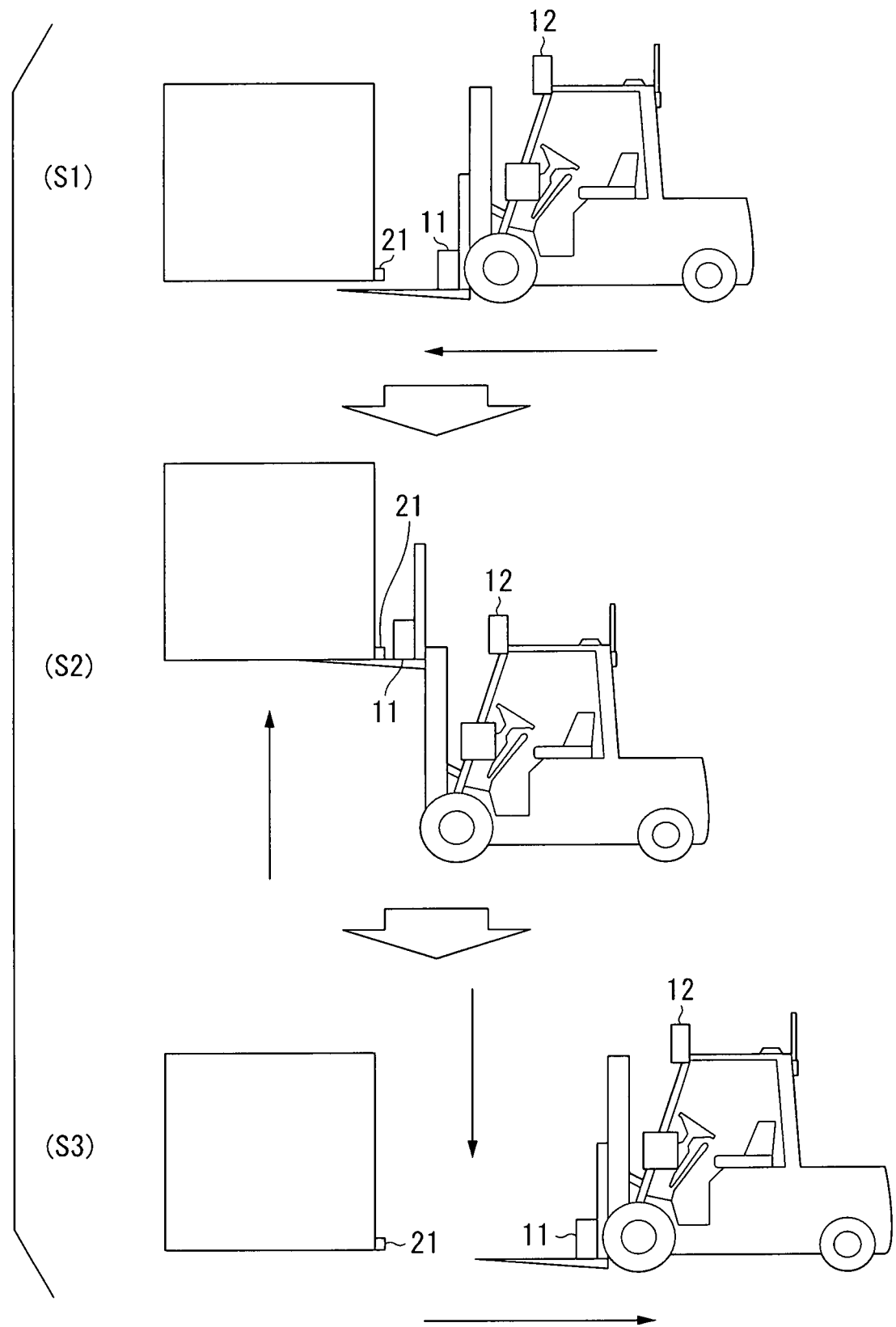
FIG. 11 is a first diagram showing a series of operations of the forklift according to the embodiment of the present invention.

FIG. 11 is a first diagram showing a series of operations of the forklift.

Next, an example in which the forklift disposes the container 20 that is placed on a site such as a container yard in another position in the site will be described. In this case, a position at which the container 20 at the site which is the container yard is placed is a carrying-in source. Further, the other position is a carrying-out destination.

The driver operates the forklift 10 to insert the fork of the forklift 10 under the bottom of the container 20 (step S1). Accordingly, the first antenna 11 receives the cargo ID. The cargo management unit 72 determines that the cargo ID has been detected in the first antenna 11 and detects that the first timing occurs (FIG. 8). When a plurality of containers 20 are disposed side by side, the first antenna 11 is likely to receive cargo IDs from cargo tags 21 attached to the plurality of containers 20. When the cargo management unit 72 detects the cargo IDs of the plurality of containers 20, the cargo management unit 72 acquires the cargo ID included in a signal having the highest reception intensity. The cargo management unit 72 acquires a current position of the forklift 10 at a time when the cargo ID is acquired, from the position detection unit 74. The cargo management unit 72 primarily records the cargo ID and the current position in the storage unit 77. Further, the cargo management unit 72 outputs the cargo ID and the current position to the other-device cooperation unit 76. The other-device cooperation unit 76 may notify the high-level system of the cargo system ID, the current position, and the forklift ID. In this notification, information indicating that the first timing occurs may be included. Through such processes, the high-level system can manage which forklift works and when, where, to which cargo and what it is doing.

The driver operates the forklift 10 to move the container 20 to another position in the site. In this case, the driver lifts up the fork of the forklift 10 to secure a view (step S2). Then, each of the first antenna 11 and the second antenna 12 receives the cargo ID. When a shift from the first timing to this state occurs, the transport state determination unit 73 determines that transport is being performed. When the forklift 10 arrives at a placement position of a predetermined carrying-out destination in the site, the container 20 is disposed at that position. In this case, the second antenna 12 cannot detect the cargo ID. The cargo management unit 72 detects that the second timing occurs. In this case, the cargo management unit 72 acquires the current position at the time of detection of the second timing, from the position detection unit 74. When the forklift 10 is reversed, the cargo management unit 72 cannot detect the cargo ID with the first antenna 11 (step S3). The cargo management unit 72 outputs the current position and the cargo ID which are not detected by the first antenna 11 and the second antenna 12, to the other-device cooperation unit 76. The other-device cooperation unit 76 may notify the high-level system of the detection of the cargo ID, the current position, the forklift ID, and the detection of the second timing. Through such process, the high-level system can manage which forklift works and when, where, to which cargo and what it is doing.

Figure 12:
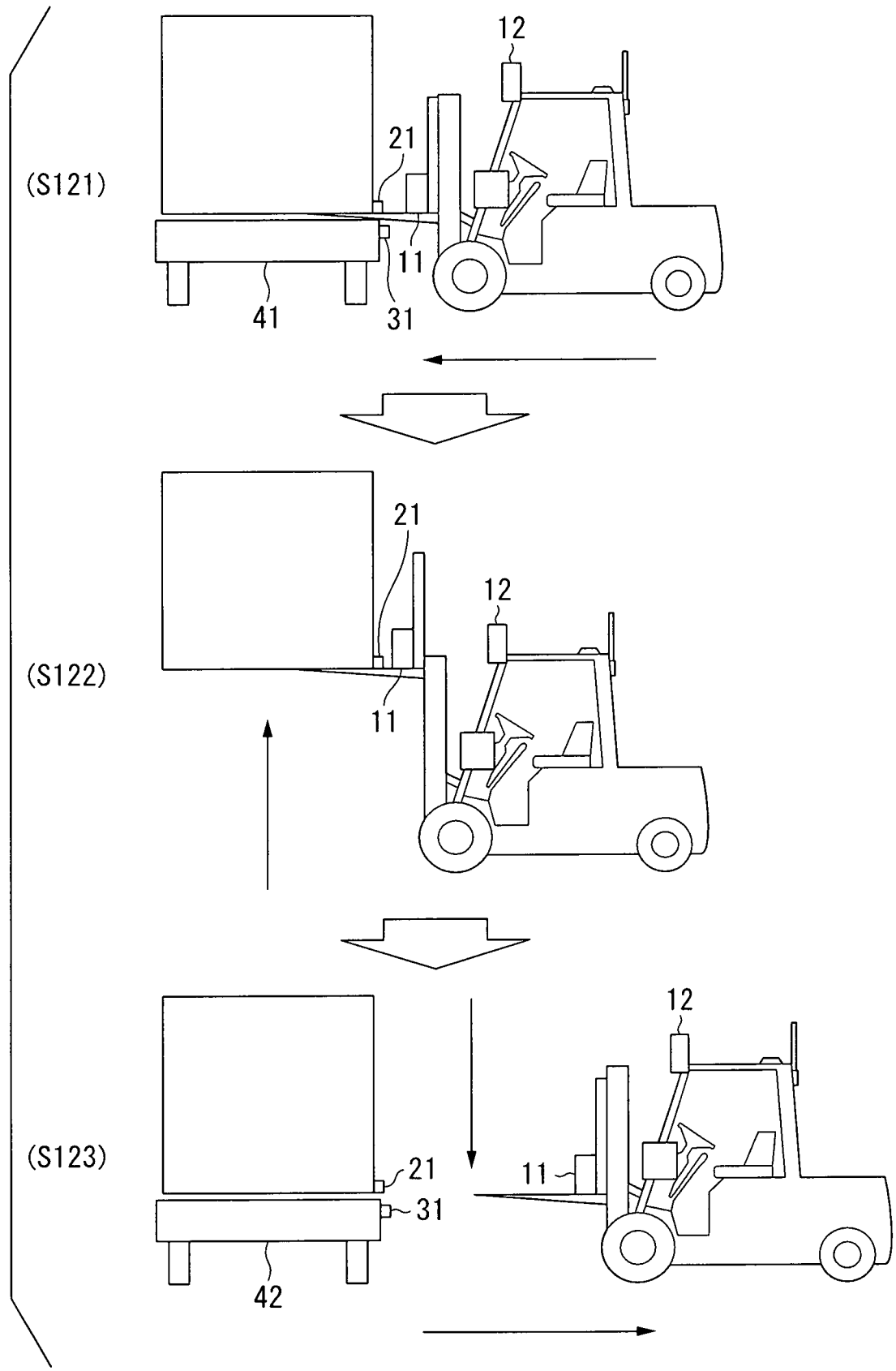
FIG. 12 is a second diagram showing a series of operations of the forklift according to the embodiment of the present invention.

FIG. 12 is a second diagram showing a series of operations of the forklift.

Next, an example in a case in which the forklift 10 disposes the container 20 placed on one of the freight vehicles 41 onto another freight vehicle 42 will be described.

In this case, one of the freight vehicles 41 is a carrying-in source. Further, the other freight vehicle 42 is a carrying-out destination.

The driver operates the forklift 10 to insert the fork of the forklift 10 under the bottom of the container 20 loaded on the freight vehicle 41 (step S121). Accordingly, the first antenna 11 receives the cargo ID and the placement position ID. The cargo management unit 72 determines that the cargo ID and the placement position ID are detected in the first antenna 11 and detects that the third timing occurs (FIG. 9). The tag data checking unit 78 may determine whether or not the placement position ID indicates the freight vehicle. For example, when the forklift 10 transports out the cargo from a pre-designated freight vehicle, the tag data checking unit 78 may determine whether the placement position ID indicates the freight vehicle and may determine that a warning display is performed when the placement position ID does not indicate the freight vehicle. When a plurality of containers 20 are disposed side by side on the freight vehicle 41, the first antenna 11 is likely to receive the cargo IDs from the cargo tags 21 attached to the plurality of containers 20. When the cargo management unit 72 detects the cargo IDs of the plurality of containers 20, the cargo management unit 72 determines that the cargo ID included in a signal with the highest reception intensity is acquired. Further, in this case, when a plurality of placement position tags 31 are attached to the freight vehicle, the cargo management unit 72 is likely to determine that a plurality of placement position IDs are received. In this case, the cargo management unit 72 determines whether or not the placement position ID is received through a signal having the same degree of signal intensity as the signal intensity of the signal through which the cargo ID is received. When the placement position ID is received through the signal having the same degree of signal intensity as the signal intensity of the cargo ID, the position of the cargo and the placement position substantially match each other. Therefore, the cargo management unit 72 acquires a combination of the cargo ID and the placement position ID received with the same degree of signal intensity.

The cargo management unit 72 acquires the current position of the forklift 10 at a time when the cargo ID and the placement position ID are acquired, from the position detection unit 74. The cargo management unit 72 primarily records the cargo ID, the placement position ID and the current position in the storage unit 77. Further, the cargo management unit 72 outputs the cargo ID, the placement position ID and the current position to the other-device cooperation unit 76. The other-device cooperation unit 76 may notify the upper-level system of the cargo ID, the placement position ID, the current position and the forklift ID. In this notification, information indicating that the third timing occurs may be included. Through such process, the high-level system can manage when, where, to which cargo and what a forklift is doing.

The driver operates the forklift 10 to move the container 20 onto the other freight vehicle 42. In this case, the driver lifts up the fork of the forklift 10 to secure a field of vision (step S122). Then, each of the first antenna 11 and the second antenna 12 receives the cargo ID. When a shift from the third timing to this state occurs, the transport state determination unit 73 determines that the transport is being performed. When the driver arrives at the other freight vehicle 42, the driver disposes the container 20 on the freight vehicle 42. In this case, the second antenna 12 cannot detect the cargo ID. Further, the first antenna 11 receives the cargo ID and the placement position ID of the placement position tag 31 attached to the freight vehicle 42. Accordingly, the cargo management unit 72 detects that the fourth timing occurs. In this case, when a plurality of placement position tags 31 are attached to the freight vehicle, the cargo management unit 72 is likely to determine that the plurality of placement position IDs are received. In this case, the cargo management unit 72 determines whether or not the placement position ID is received through a signal having the same degree of signal intensity as the signal intensity of the signal through which the cargo ID is received. When the placement position ID is received through the signal having the same degree of signal intensity as the signal intensity of the cargo ID, the position of the cargo and the placement position substantially match each other. Therefore, the cargo management unit 72 acquires a combination of the cargo ID and the placement position ID received with the same degree of signal intensity.

The cargo management unit 72 acquires the current position at the time of detection of the fourth timing, from the position detection unit 74. When the forklift 10 is reversed, the cargo management unit 72 cannot detect the cargo ID and the placement position 1D with the first antenna 11 (step S123). The cargo management unit 72 outputs the cargo ID and the placement ID to the other-device cooperation unit 76. The other-device cooperation unit 76 may notify the high-level system of the cargo ID, the placement position ID, the current position, the forklift ID and the detection of the fourth timing. Through such process, the high-level system can manage which forklift works and when, where, to which cargo and what it is doing.

Figure 13:
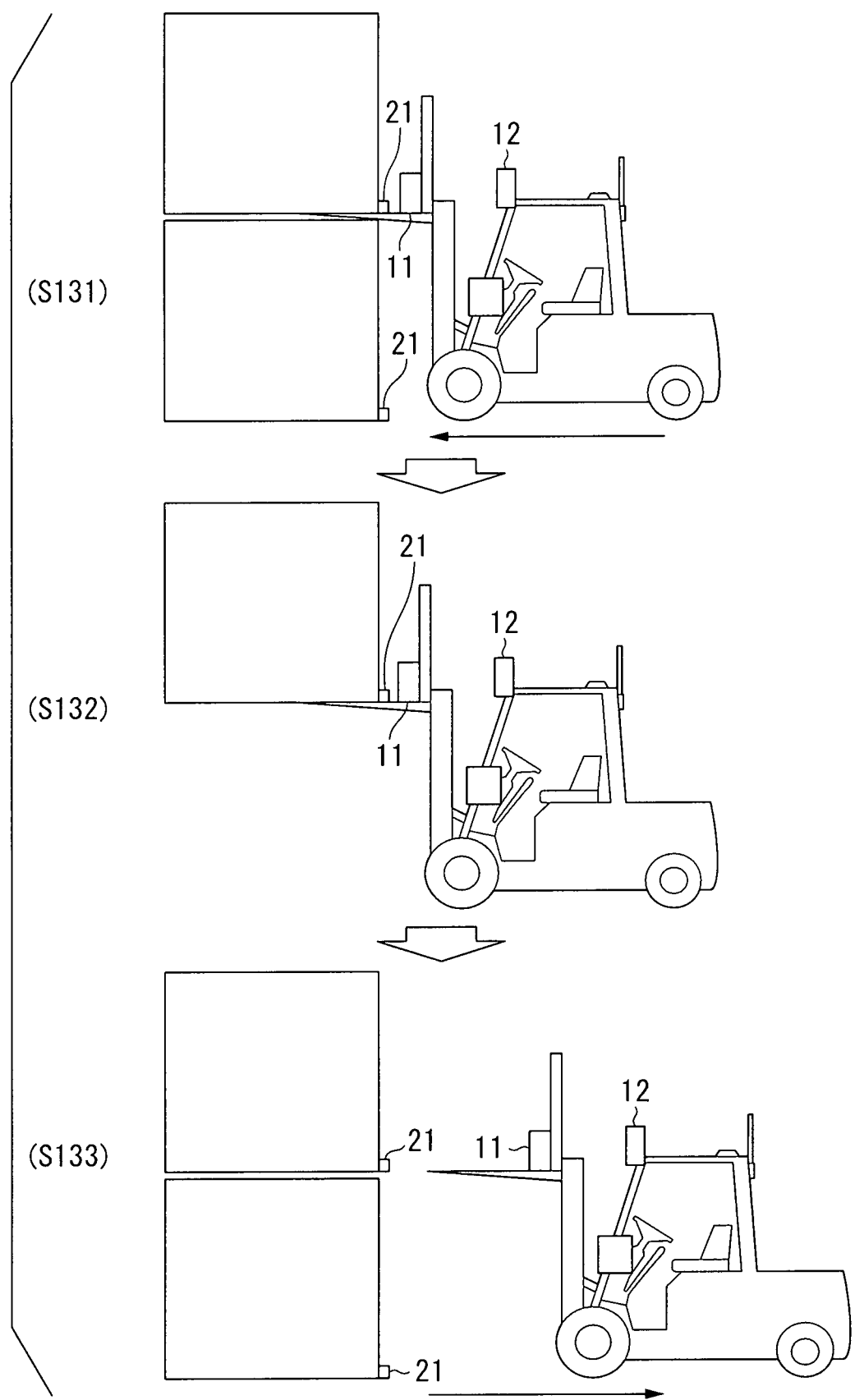
FIG. 13 is a third diagram showing a series of operations of the forklift according to the embodiment of the present invention.

FIG. 13 is a third diagram showing a series of operations of the forklift.

Next, a case in which the forklift 10 disposes a container 20 in an upper stage stacked vertically in two stages in one placement position at the site of the container yard, onto the container 20 placed at another placement position in the site, will be described. In this case, one placement position is a carrying-in source. Further, the other placement position is a carrying-out destination.

The driver operates the forklift 10 to insert the fork of the forklift 10 under the bottom of the container 20 at an upper stage among the containers 20 stacked vertically in two stages in one placement position (step S131). When the forklift 10 inserts the fork of the forklift 10 under the bottom of the container 20 at the upper stage, the second antenna 12 has been attached to the forklift 10 in advance so that the second antenna 12 is located at the same height as the height of the cargo tag 21 of the container 20. Accordingly, the cargo ID is received by the first antenna 11 and the second antenna 12. The cargo management unit 72 determines that the cargo ID is detected by the first antenna 11 and the second antenna 12 and detects that the fifth timing occurs. When a plurality of containers 20 are disposed side by side, the first antenna 11 or the second antenna 12 is likely to receive the cargo IDs from the cargo tags 21 attached to the plurality of containers 20. When the cargo IDs of the plurality of containers 20 are received by each antenna, the cargo management unit 72 determines that the cargo ID included in a signal with the highest reception signal intensity is acquired.

The cargo management unit 72 acquires the current position of the forklift 10 at a time when the cargo ID is acquired, from the position detection unit 74. The cargo management unit 72 primarily records the cargo ID and the current position in the storage unit 77. Further, the cargo management unit 72 outputs the cargo ID and the current position to the other-device cooperation unit 76. The other-device cooperation unit 76 may notify the upper-level system of the cargo ID, the current position and the forklift ID. In this notification, information indicating that the fifth timing occurs may be included. Through such process, the high-level system can manage when, where, to which cargo and what a forklift is doing.

The driver operates the forklift 10 to move the container 20 to the other placement position. In this case, the driver drives it while securing a field of vision by lifting up the fork of the forklift 10 (step S132). Each of the first antenna 11 and the second antenna 12 always receives the cargo ID on driving. The transport state determination unit 73 determines that the transport is being performed when a period of time during which the cargo ID is detected by the first antenna 11 and the second antenna 12 has continued for a predetermined time or longer. When the driver arrives at the other placement position, the drivers disposes the transported container 20 onto the container 20 that has already been disposed. When the driver backs the forklift 10 to pull out the fork from under the container 20 transported to the other placement position, both the first antenna 11 and the second antenna 12 cannot detect the cargo ID (step S133). Accordingly, the cargo management unit 72 detects that the sixth timing occurs.

The cargo management unit 72 acquires the current position at the time of detection of the sixth timing, from the position detection unit 74. The cargo management unit 72 outputs the cargo ID that cannot be detected and the current position to the other-device cooperation unit 76. The other-device cooperation unit 76 may notify the high-level system of the cargo ID, the current position, the forklift ID and the detection of the sixth timing. Through such process, the above-described high-level system can manage which forklift works and when, where, to which cargo and what it is doing.

Figure 14:
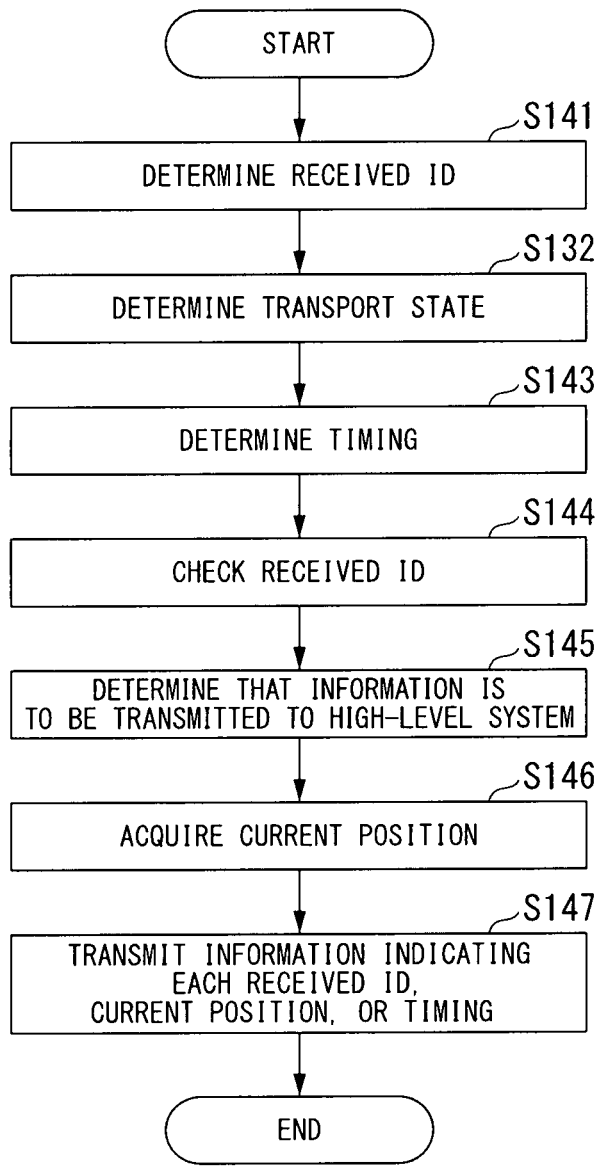
FIG. 14 is a diagram showing a processing flow of the cargo management device according to the embodiment of the present invention.

FIG. 14 is a diagram showing a processing flow of the cargo management device 1.

In the cargo management device 1, the cargo management unit 72 determines whether the ID received in the first antenna 11 or the second antenna 12 is the cargo ID or the placement position ID (step S141). Then, the transport state determination unit 73 determines a transport state of the forklift 10 (step S142). The cargo management unit 72 detects the transport state, specifies the received ID, and determines a current timing (for example, the first to sixth timings) on the basis of such recorded time-series information (step S143). Further, the tag data checking unit 78 checks the received cargo ID or placement position ID (step S144). The tag data checking unit 78 may output warning information or the like to a monitor when a data system of the checked cargo ID or placement position ID does not match the system recorded in the storage unit 77. When the current timing is a predetermined timing, the cargo management unit 72 determines that the information is to be transmitted to the high-level system (step S145). The cargo management unit 72 acquires the current position from the position detection unit 74 (step S146). The cargo management unit 72 transmits information indicating the cargo ID, the placement position ID, the current position and the timing to the high-level system (step S147).

The cargo management device 1 may receive and store a work schedule list from the high-level system or the like in advance. In the work schedule list, information on an order of the cargo IDs of containers to be transported, the carrying-out source and the carrying-out destination is recorded. The cargo management unit 72 of the cargo management device 1 may compare the order of the cargo IDs of the containers 20 to be transported or the carrying-out source and the carrying-out destination of the container 20 with the work schedule list to determine whether the order, the carrying-out source and the carrying-out destination match those in the work schedule list. In this case, the cargo management unit 72 may display warning information on a touch panel display or the like when time-series information on a work situation of the forklift 10 does not match that in the work schedule list. Accordingly, it is possible to prevent erroneous transfer of the cargo of an operator.

The cargo management device 1 may store a map in the storage unit and the display unit 75 may display the map and the current position on the display.

Further, the cargo management device 1 may determine a signal intensity from the cargo tag 21 or the placement position tag 31, store the signal intensity thereof and manage a change in the signal intensity. The cargo management device 1 may determine whether or not the signal intensity becomes significantly weaker, and determine that the cargo tag 21 or the placement position tag 31 is deteriorated when the signal intensity becomes weaker. In this case, the cargo management device 1 outputs a deterioration signal including information (the cargo ID or the placement position ID) on the deteriorated cargo tag 21 or placement position tag 31 and the current position to the high-level system. Accordingly, it is possible to specify the deteriorated cargo tag 21 or placement position tag 31 in the high-level system.

The first antenna 11 and the second antenna 12 described above may have a function of controlling the directivity. For example, the cargo management device 1 may be able to electrically or mechanically change a direction of the directivity of the first antenna or the second antenna or a radio wave output intensity. For example, the directivity or output of the second antenna may be increased as compared to the first antenna, such that a signal from each of tags at a distant place can be received.

Figure 15:
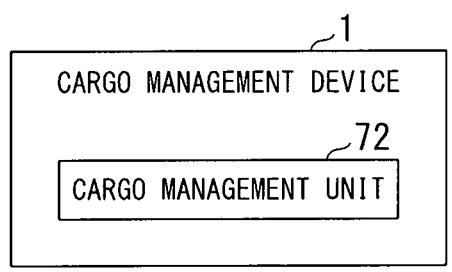
FIG. 15 is a diagram showing a minimum configuration of the cargo management device according to the embodiment of the present invention.

FIG. 15 is a diagram showing a minimum configuration of the cargo management device.

As shown in FIG. 15, a cargo management device 1 includes at least a cargo management unit 72. The cargo management unit 72 determines whether or not the cargo ID transmitted from the cargo tag 21 attached to the cargo is detected by the first antenna provided in the cargo gripping mechanism of the transport vehicle. The cargo management unit 72 determines a carrying-in source or a carrying-out destination of the cargo on the basis of a detection situation of the cargo ID.

The cargo management device described above has a computer system. The steps of each process described above are stored in the form of a program in a computer-readable recording medium, and the above process is performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving this distribution may execute the program.

Further, the above program may be a program for realizing some of the above-described functions. Furthermore, the above program may be a so-called difference file (differential program) which can realize the above-described functions in combination with a program already recorded in the computer system.

INDUSTRIAL APPLICABILITY

The present invention is also applicable to applications in which it is indispensable to determine a carrying-in source or a carrying-out destination of a cargo that a transport vehicle transports without obtaining operation information of a cargo gripping mechanism of the transport vehicle.

REFERENCE SIGNS LIST

1 Cargo management device
10 Forklift
11 First antenna
12 Second antenna
13 Satellite positioning antenna
14 Communication antenna
20 Container
21 Cargo tag
71 ID detection unit
72 Cargo management unit
73 Transport state determination unit
74 Position detection unit
75 Display unit
76 Other-device cooperation unit
77 Storage unit
78 Tag data checking unit

The invention claimed is:

1. A cargo management device comprising a cargo management unit configured to:
   determine whether or not a cargo identifier (ID) transmitted from a cargo ID transmission device attached to a cargo is detected by a first antenna provided in a cargo gripping mechanism of a transport vehicle;
   determine whether or not the cargo ID is detected by a second antenna provided in the transport vehicle in advance to be located near the first antenna when the cargo gripping mechanism is lifted up to a predetermined height; and
   determine a carrying-in source or a carrying-out destination of the cargo based on the cargo ID detected by each of the first antenna and the second antenna.

2. The cargo management device according to claim 1 further comprising
   a transport state determination unit configured to determine a cargo transport state of the transport vehicle based on the situation in which the cargo ID is detected by each of the first antenna and the second antenna.

3. The cargo management device according to claim 1, wherein
   the cargo management unit is further configured to:
   determine whether or not a placement position ID transmitted from a placement position ID transmission device installed at a carrying-out destination is detected by at least one of the first antenna and the second antenna; and
   determine the carrying-in source or the carrying-out destination based on the detection of the placement position ID.

4. The cargo management device according to claim 3, wherein
   the cargo management unit is further configured to determine the carrying-in source or the carrying-out destination based on a signal intensity including the placement position ID.

5. A cargo management method comprising:
   determining whether or not a cargo ID transmitted from a cargo ID transmission device attached to a cargo is detected by a first antenna provided in a cargo gripping mechanism of a transport vehicle;
   determining whether or not the cargo ID is detected by a second antenna provided in the transport vehicle in advance to be located near the first antenna when the cargo gripping mechanism is lifted up to a predetermined height; and determining a carrying-in source or a carrying-out destination of the cargo based on the cargo ID detected by each of the first antenna and the second antenna.

6. A non-transitory computer-readable recording medium having a computer program that causes a computer of a cargo management device to function as a cargo management means configured to:

determine whether or not a cargo ID transmitted from a cargo ID transmission device attached to a cargo is detected by a first antenna provided in a cargo gripping mechanism of a transport vehicle;

determining whether or not the cargo ID is detected by a second antenna provided in the transport vehicle in advance to be located near the first antenna when the cargo gripping mechanism is lifted up to a predetermined height; and determine a carrying-in source or a carrying-out destination of the cargo based on the cargo ID detected by each of the first antenna and the second antenna.

* * * * *